(12) United States Patent
Lea

(10) Patent No.: US 6,361,061 B1
(45) Date of Patent: Mar. 26, 2002

(54) BOAT PROTECTION SYSTEM

(76) Inventor: Rich A. Lea, 12 S. Kensington Ave. SW., Kensington, MN (US) 56343

( * ) Notice: Subject to any disclaimer, the term of this patent is extended or adjusted under 35 U.S.C. 154(b) by 0 days.

(21) Appl. No.: 09/715,440

(22) Filed: Nov. 16, 2000

(51) Int. Cl.[7] .................................................. B60P 3/10
(52) U.S. Cl. ..................... 280/414.1; 280/155; 280/768; 280/770; 296/180.4
(58) Field of Search ............................. 280/414.1, 768, 280/770, 847, 155, 849; D12/106; 296/180.4, 181

(56) References Cited

U.S. PATENT DOCUMENTS

| | | |
|---|---|---|
| 3,339,217 A | 9/1967 | Gudmundson ........... 280/414.1 |
| 3,528,095 A | 9/1970 | Gudmundson ........... 280/414.1 |
| 3,746,366 A * | 7/1973 | Bruce et al. ................. 280/851 |
| 4,157,200 A | 6/1979 | Johnson ...................... 296/1 S |
| 4,421,354 A * | 12/1983 | Lemaster ..................... 296/1 S |
| 4,781,392 A | 11/1988 | Cooper ..................... 280/414.1 |
| 4,840,400 A * | 6/1989 | Greenleaf ................... 280/770 |
| 4,936,599 A * | 6/1990 | McNamee ................... 280/770 |
| 5,058,946 A * | 10/1991 | Faber ....................... 280/414.1 |
| 5,072,963 A | 12/1991 | Avillez de Basto ...... 280/414.1 |
| D356,058 S * | 3/1995 | Newton ...................... D12/106 |
| 5,480,174 A | 1/1996 | Grenier ................... 280/414.1 |
| 5,481,999 A * | 1/1996 | Clark ......................... 114/361 |
| 5,762,374 A * | 6/1998 | Grove et al. ................ 280/770 |
| 6,109,639 A * | 8/2000 | Blassingame et al. ... 280/414.1 |

* cited by examiner

*Primary Examiner*—Daniel G. DePumpo
(74) *Attorney, Agent, or Firm*—Michael S. Neustal

(57) ABSTRACT

A boat protection system for protecting the body of a boat during transporting upon a conventional boat trailer. The boat protection system includes a front guard, a bottom guard attachable to the front guard, a first side guard attachable to the front guard, and a second side guard attachable to the front side guard. The front guard is comprised of a front portion, a front opening within the front portion for receiving a winch, and a pair of side portions. The front guard is attached to the front portion of the frame with conventional fasteners. The bottom guard is attached to a lower lip of the front guard. The front guard, bottom guard, and side guards protect the lower body of the boat carried upon the trailer from debris elevated by a motor vehicle pulling the trailer.

20 Claims, 7 Drawing Sheets ated. There are additional features of the invention that
BOAT PROTECTION SYSTEM

BACKGROUND OF THE INVENTION

1. Field of the Invention

The present invention relates generally to boat trailers and more specifically it relates to a boat protection system for protecting the body of a boat during transporting upon a conventional boat trailer.

2. Description of the Prior Art

Boat trailers have been in use for years. Typically, a boat trailer is comprised of an elongate tubular frame, a plurality of wheels rotatably attached to the frame of the trailer, and a boat support structure attached to the frame for supporting the boat in a desired position.

The main problem with conventional boat trailers is that they allow debris such as gravel thrown by the tires of the vehicle to engage the body of the boat thereby damaging the body of the boat. In addition, conventional boat trailers do not adequately protect the boat from becoming contaminated with dirt, oil and other debris that significantly diminish the overall appearance of the boat.

Examples of patented boat trailer related devices which are illustrative of such prior art include U.S. Pat. No. 4,157,200 to Johnson; U.S. Pat. No. 5,072,963 to Avillez de Basto; U.S. Pat. No. 4,781,392 to Cooper; U.S. Pat. No. 3,339,217 to Gudmundson; U.S. Pat. No. 3,528,095 to Gudmundson; U.S. Pat. No. 5,480,174 to Grenier.

While these devices may be suitable for the particular purpose to which they address, they are not as suitable for protecting the body of a boat during transporting upon a conventional boat trailer. Conventional boat trailers simply do not adequately protect the boat from damage during travel behind a motor vehicle.

In these respects, the boat protection system according to the present invention substantially departs from the conventional concepts and designs of the prior art, and in so doing provides an apparatus primarily developed for the purpose of protecting the body of a boat during transporting upon a conventional boat trailer.

SUMMARY OF THE INVENTION

In view of the foregoing disadvantages inherent in the known types of boat trailers now present in the prior art, the present invention provides a new boat protection system construction wherein the same can be utilized for protecting the body of a boat during transporting upon a conventional boat trailer.

The general purpose of the present invention, which will be described subsequently in greater detail, is to provide a new boat protection system that has many of the advantages of the boat trailers mentioned heretofore and many novel features that result in a new boat protection system which is not anticipated, rendered obvious, suggested, or even implied by any of the prior art boat trailers, either alone or in any combination thereof.

To attain this, the present invention generally comprises a front guard, a bottom guard attachable to the front guard, a first side guard attachable to the front guard, and a second side guard attachable to the first side guard. The front side guard is comprised of a front portion, a front opening within the front portion for receiving a winch, and a pair of side portions. The front guard is attached to the front portion of the frame with conventional fasteners. The bottom guard is attached to a lower lip of the front guard. The front guard, bottom guard, and side guards protect the lower body of the boat carried upon the trailer from debris elevated by a motor vehicle pulling the trailer.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a boat protection system that will overcome the shortcomings of the prior art devices.

A second object is to provide a boat protection system for protecting the body of a boat during transporting upon a conventional boat trailer.

Another object is to provide a boat protection system that reduces damage to a boat during transporting from one location to another.

An additional object is to provide a boat protection system that is attachable to various types of boat trailers.

A further object is to provide a boat protection system that extends the useful life of a boat.

Another object is to provide a boat protection system that can be easily attached and removed from a conventional boat trailer.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
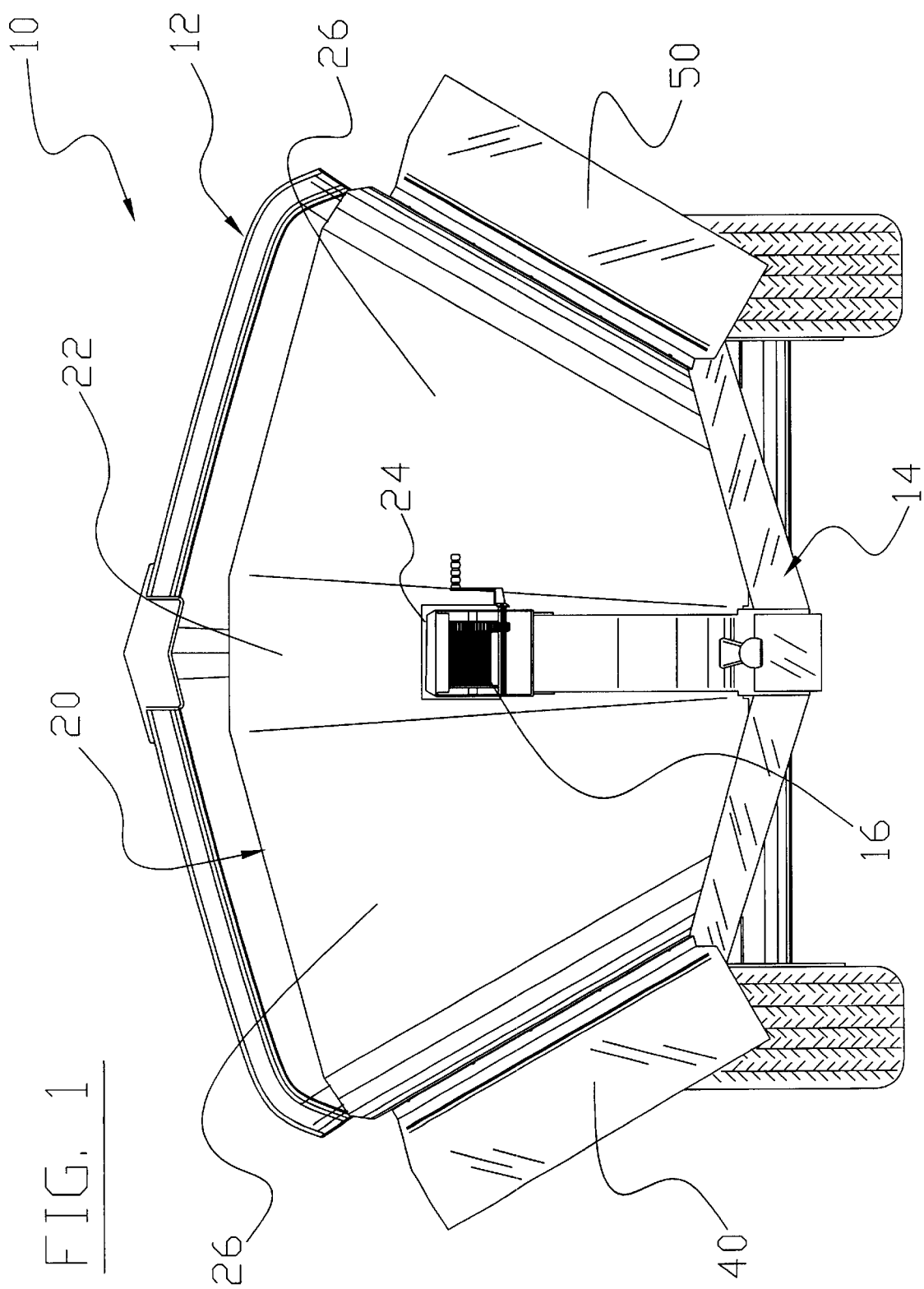
FIG. 1 is a front view of the present invention attached to a conventional boat trailer.

Turning now descriptively to the drawings, in which similar reference characters denote similar elements throughout the several views, FIGS. 1 through 7 illustrate a boat protection system 10, which comprises a front guard 20, a bottom guard 30 attachable to the front guard 20, a first side guard 40 attachable to the front guard 20, and a second side guard 50 attachable to the front side guard. The front guard 20 is comprised of a front portion 22, a front opening 24 within the front portion 22 for receiving a winch 16, and a pair of side portions 26. The front guard 20 is attached to the front end of the frame with conventional fasteners. The bottom guard 30 is attached to a lower lip 28 of the front guard 20. The front guard 20, bottom guard 30, and side guards protect the lower body of the boat 12 carried upon the trailer 14 from debris elevated by a motor vehicle pulling the trailer 14. The front guard 20, bottom guard 30, and side guards may be comprised of various type of materials such as but not limited to plastic, metal and fiberglass. The front guard 20, bottom guard 30, and side guards may be connected to one another with any well known securing means such as but not limited to fasteners, brackets or adhesive.

Figure 2:
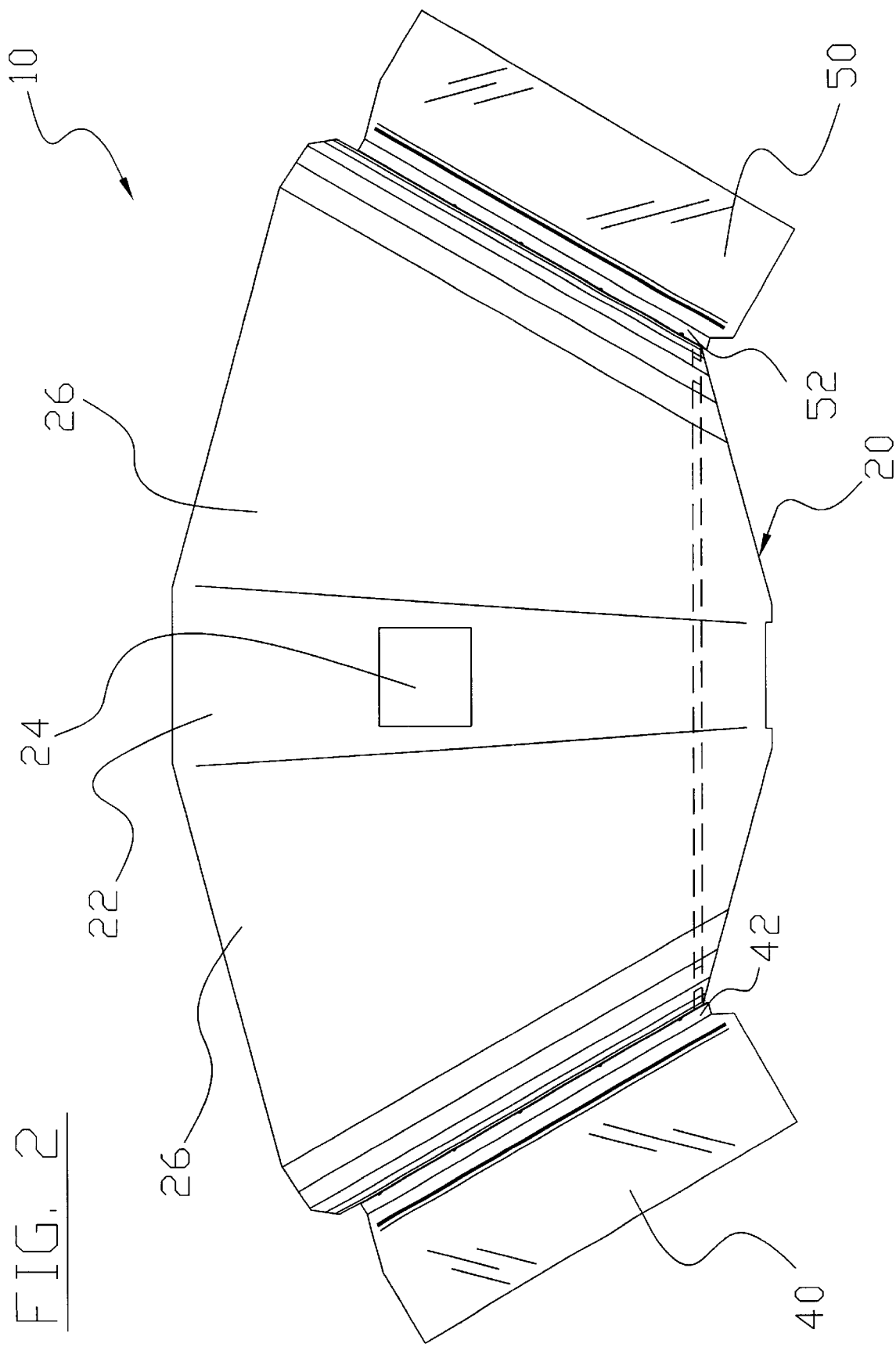
FIG. 2 is a front view of the present invention.
Figure 3:
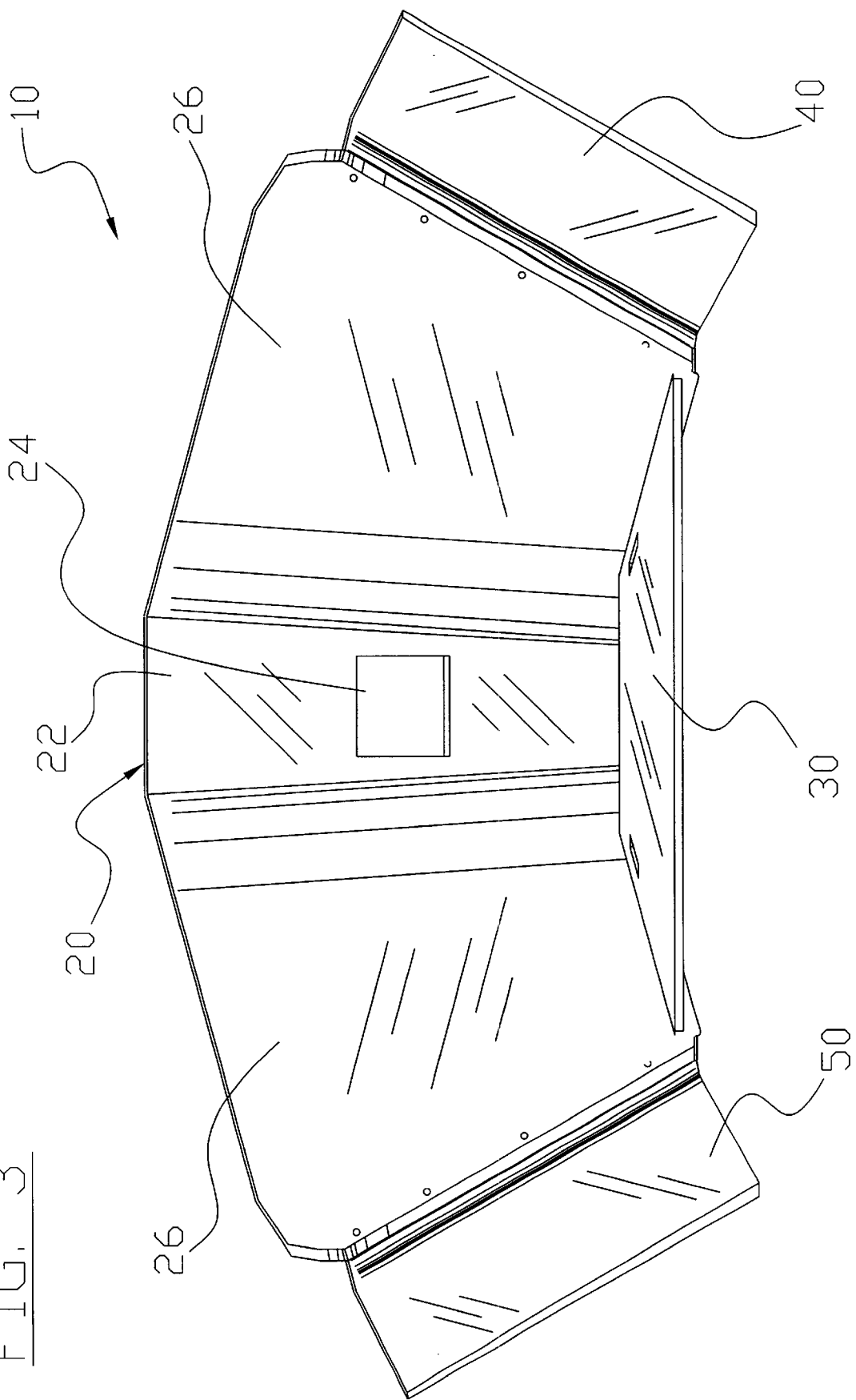
FIG. 3 is an upper rear view of the present invention.
Figure 4:
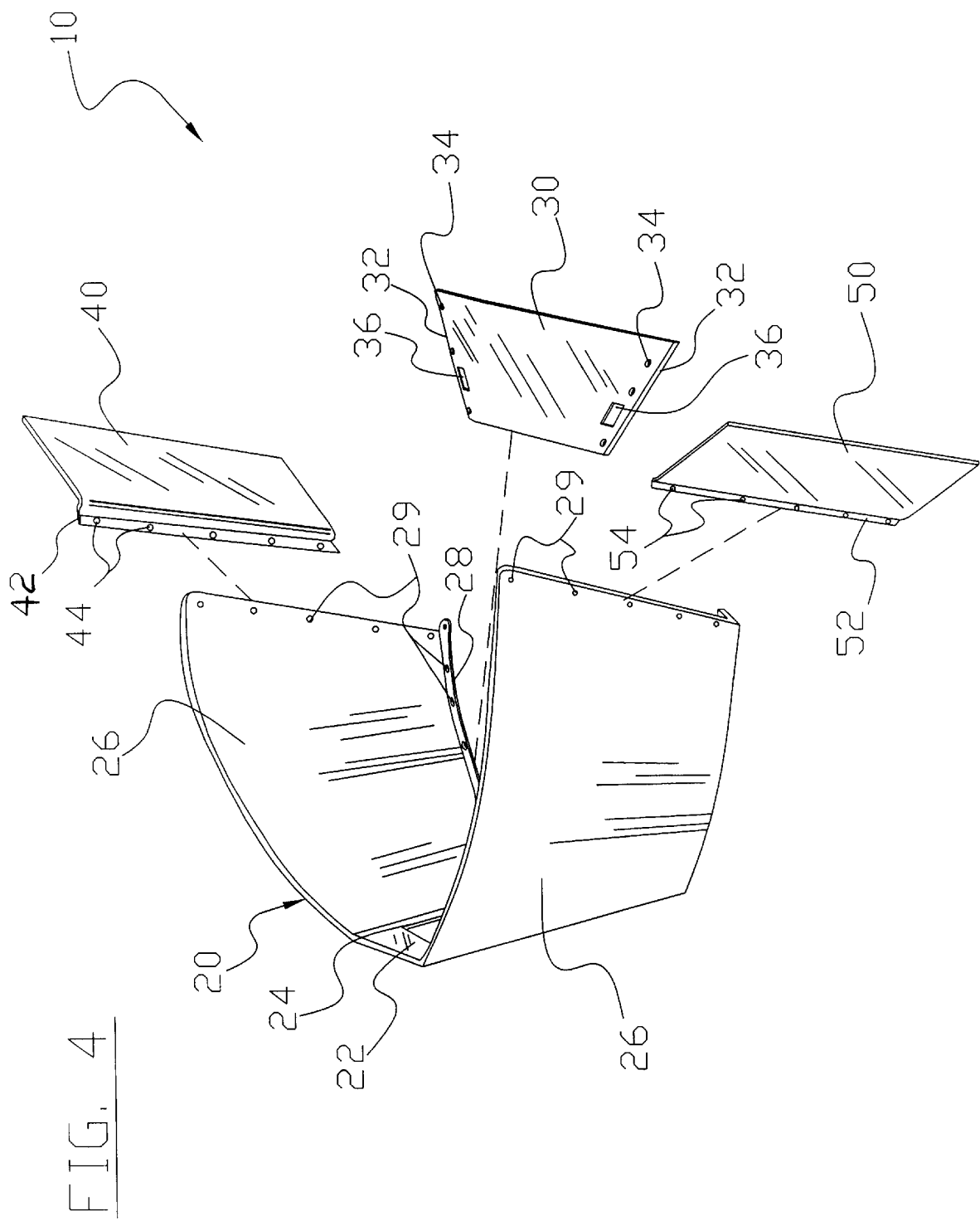
FIG. 4 is an exploded upper side view of the present invention.
Figure 5:
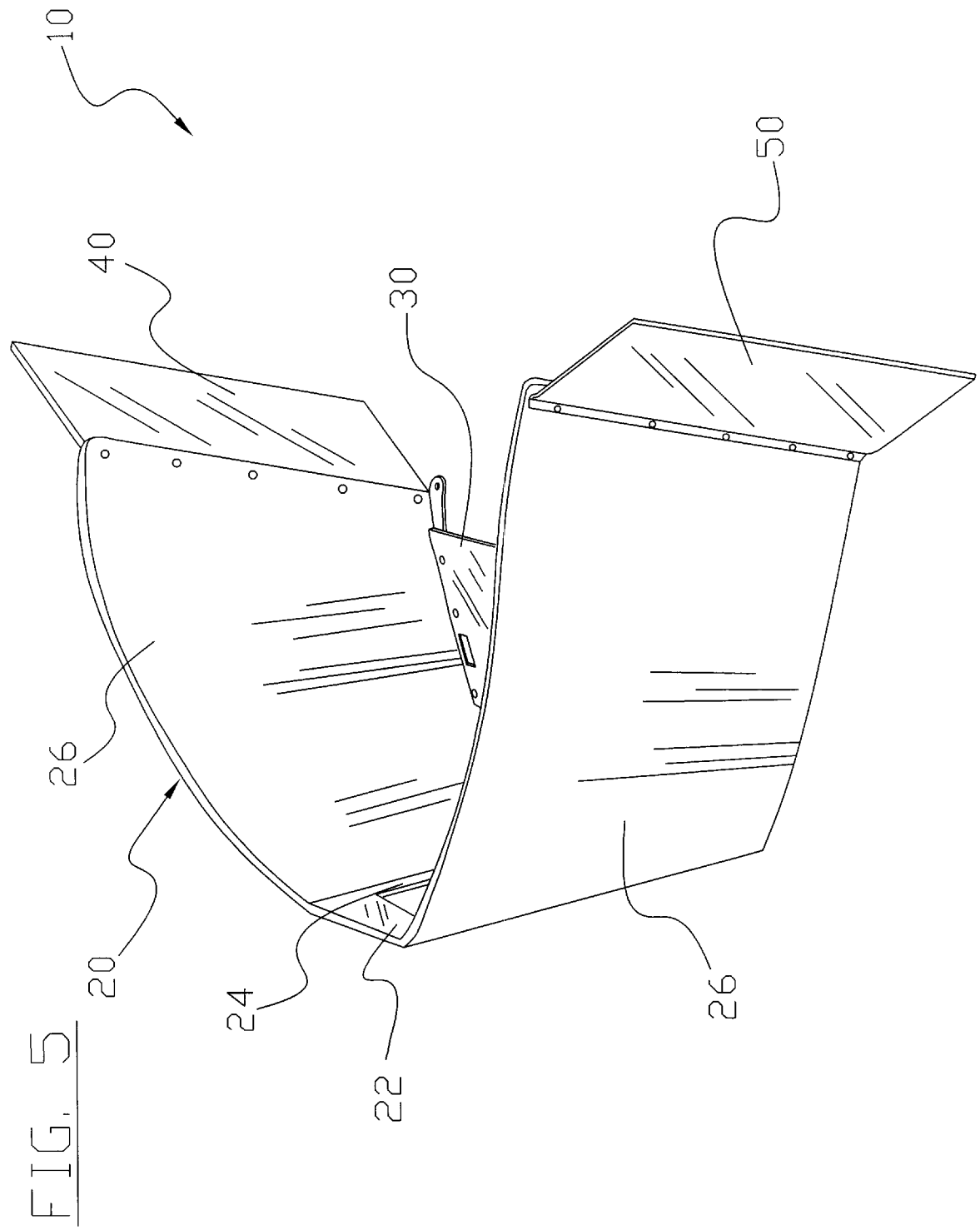
FIG. 5 is an upper side view of the present invention.
Figure 6:
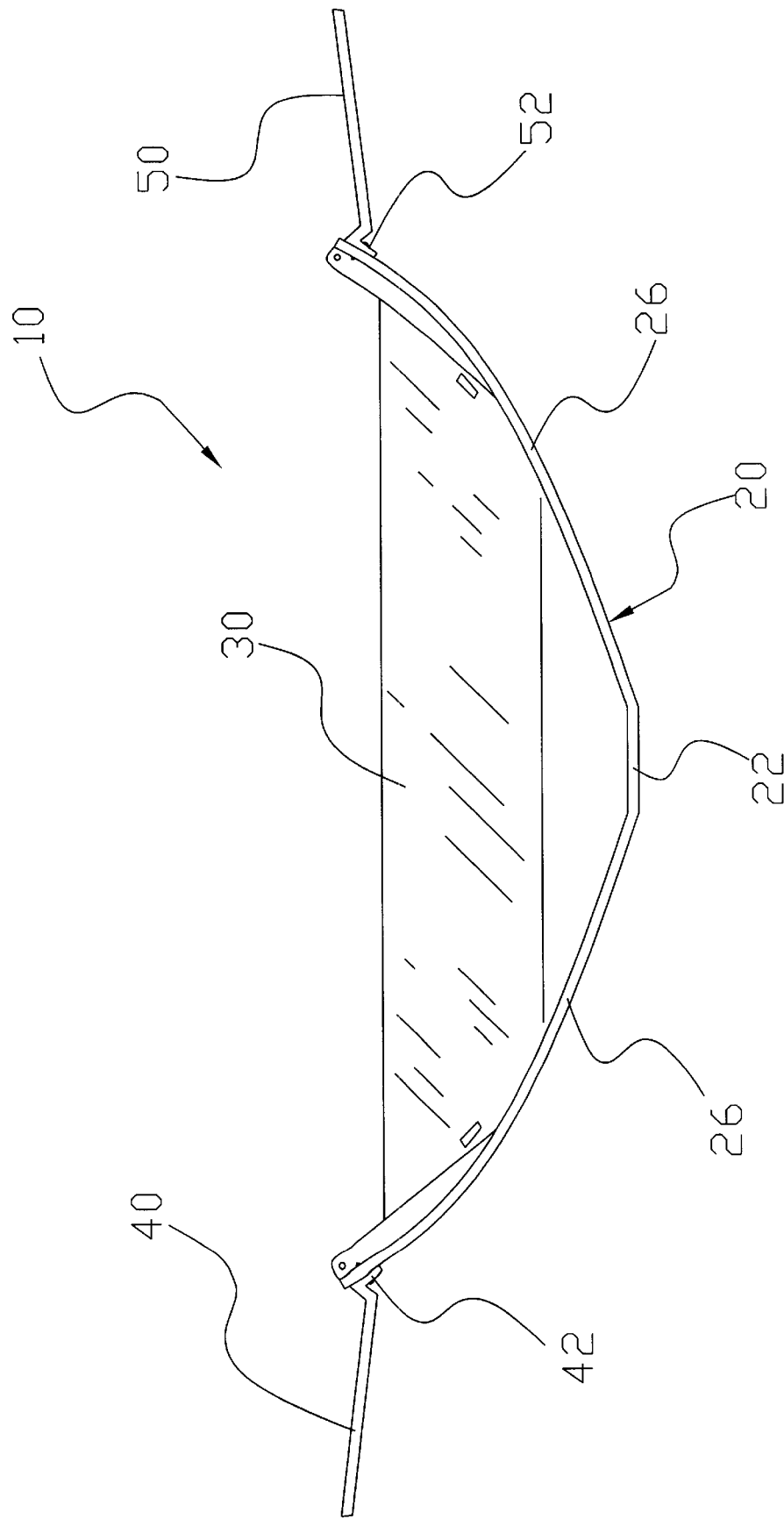
FIG. 6 is a top view of the present invention.
Figure 7:
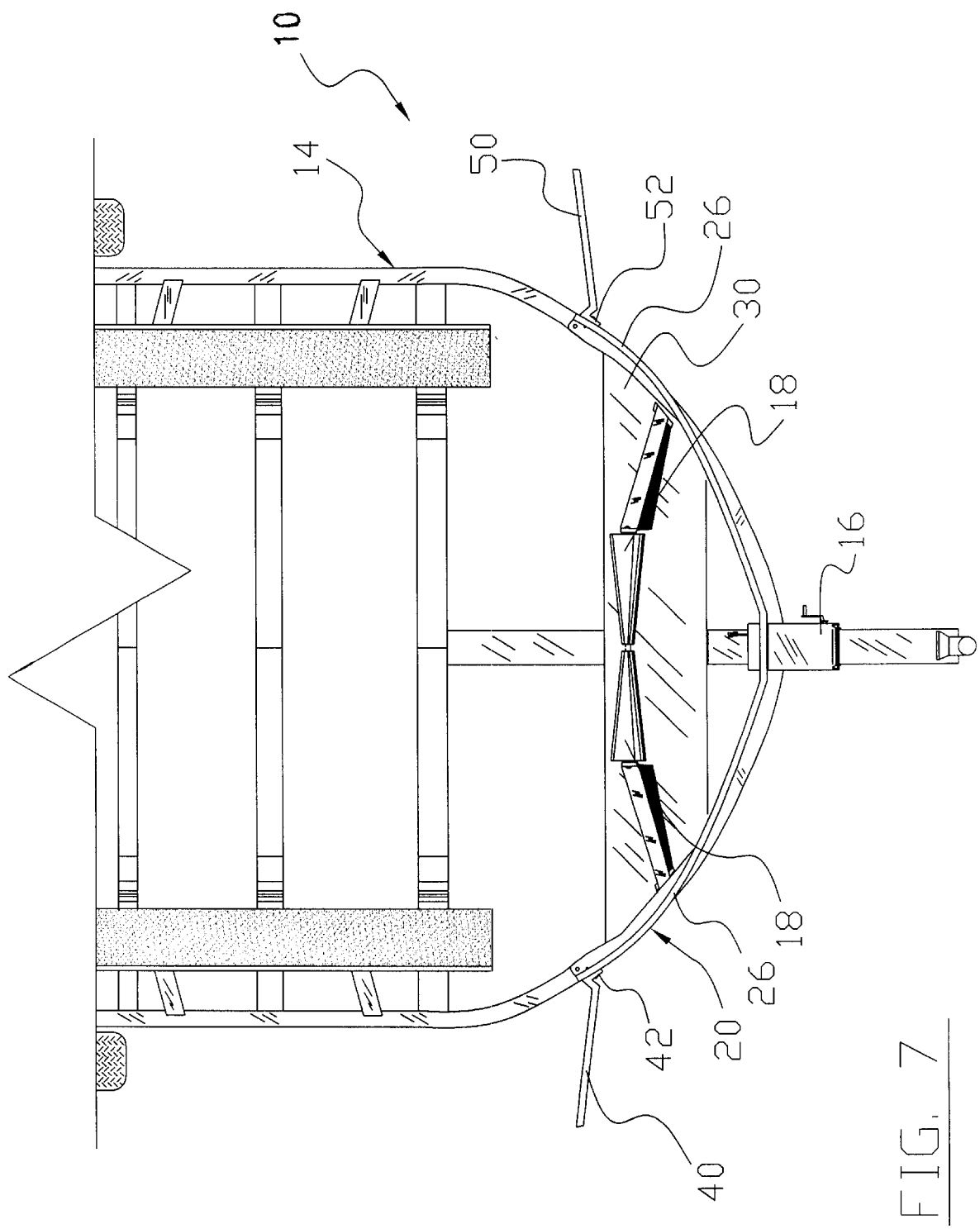
FIG. 7 is a top view of the present invention attached to a conventional boat trailer.

As best shown in FIGS. 4 through 7 of the drawings, the front guard 20 is formed to fit upon the front end of the trailer 14. The front guard 20 is formed into a U-shaped structure as best shown in FIG. 6 of the drawings. The front guard 20 is comprised of a front portion 22 and a pair of side portions 26 extending at an angle from the front portion 22. The front portion 22 preferably is substantially flat and includes a front opening 24 for receiving a wench attached to the trailer 14 as best shown in FIGS. 1 through 3 of the drawings. The side portions 26 preferably extend at an angle with respect to the front portion 22 and are preferably curved as best shown in FIGS. 6 and 7 of the drawings.

As best shown in FIG. 4 of the drawings, the lower lip 28 extends from a lower portion of the front guard 20. More particularly, the lower lip 28 extends at least from the side portions 26 of the front guard 20 inwardly to support the bottom guard 30. The lower lip 28 includes a plurality of first apertures 29 that receive a plurality of fasteners that extend through the bottom guard 30. As shown in FIG. 4 of the drawings, a plurality of additional first apertures 29 extend through the vertical edge portion of the side portions 26 of the front guard 20 for receiving a corresponding plurality of fasteners that are inserted through the side guards 40, 50.

As shown in FIG. 4 of the drawings, the bottom guard 30 is a substantially flat rectangular structure. The outer side edges 32 of the bottom guard 30 preferably are angled or curved similar to the shape of the side portions 26 of the front guard 20. A pair of bottom openings 36 extend through the bottom guard 30 for receiving the support members supporting the front rollers 18 of the trailer 14 as shown in FIGS. 4 and 7 of the drawings. A plurality of second apertures 34 extend through the bottom guard 30 adjacent the side edges 32 that correspond to the plurality of first apertures 29 within the lower lip 28 of the front guard 20 which receive a corresponding plurality of fasteners or other securing means.

As shown in FIGS. 1 through 7 of the drawings, a first side guard 40 is provided that has a first lip 42. The first lip 42 includes a plurality of third apertures 54 44 that correspond to the plurality of first apertures 29 within the vertical portions of the front guard 20 for receiving a corresponding number of fasteners. The first side guard 40 preferably extends outwardly from the distal portion of the front guard 20 as best shown in FIGS. 6 and 7 of the drawings.

As shown in FIGS. 1 through 7 of the drawings, a second side guard 50 is provided that has a second lip 52. The second lip 52 includes a plurality of fourth apertures that correspond to the plurality of second apertures 34 within the vertical portions of the front guard 20 for receiving a corresponding number of fasteners. The second side guard 50 preferably extends outwardly from the distal portion of the front guard 20 as best shown in FIGS. 6 and 7 of the drawings.

In use, the front guard 20 is attached to the front end of the frame of the trailer 14 with conventional fasteners or other securing means. The bottom guard 30 and the side guards 40, 50 are secured to the front guard 20 as shown in FIG. 5 of the drawings. When the boat 12 is positioned upon the trailer 14 and the trailer 14 is connected to a motor vehicle, the front guard 20 protects a significant portion of the boat 12 from debris kicked up from the motor vehicle. The bottom guard 30 protects the underside of the boat 12 from debris that extends upwardly behind the front guard 20. The first side guard 40 and the second side guard 50 deflect the debris from the outer portions of the boat 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A boat protection system, comprising:
   a front guard attachable to a front end of a frame of a boat trailer, wherein said front guard has a U-shape;
   a first side guard extends from a first distal end of said front guard;
   a second side guard extends from a second distal end of said front guard; and
   wherein said first side guard and said second side guard each include an angled lip that is attached to said front guard and extend outwardly from said front guard.

2. The boat protection system of claim 1, wherein said first side guard and said second side guard are rectangular shaped.

3. The boat protection system of claim 2, wherein said front guard is comprised of a front portion and a pair of opposing side portions extending at an angle from said front portion.

4. The boat protection system of claim 3, wherein said pair of side portions are curved to conform to a shape of said frame of said boat trailer.

5. The boat protection system of claim 1, wherein said front guard is comprised of a front portion and a pair of opposing side portions extending at an angle from said front portion.

6. The boat protection system of claim 5, wherein said pair of side portions are curved to conform to a shape of said frame of said boat trailer.

7. The boat protection system of claim 1, including a bottom guard attached to a lower portion of said front guard.

8. The boat protection system of claim 7, wherein said front guard includes at least one lower lip, wherein said bottom guard is attached to said at least one lower lip.

9. A boat protection system, comprising:
- a front guard attachable to a front end of a frame of a boat trailer, wherein said front guard has a U-shape;
- a front opening extending through said front guard for receiving a winch from said boat trailer;
- a first side guard extends from a first distal end of said front guard;
- a second side guard extends from a second distal end of said front guard; and
- wherein said first side guard and said second side guard each include an angled lip that is attached to said front guard and extend outwardly from said front guard.

10. The boat protection system of claim 9, wherein said first side guard and said second side guard are rectangular shaped.

11. The boat protection system of claim 10, wherein said front guard is comprised of a front portion and a pair of opposing side portions extending at an angle from said front portion.

12. The boat protection system of claim 11, wherein said pair of side portions are curved to conform to a shape of said frame of said boat trailer.

13. The boat protection system of claim 9, wherein said front guard is comprised of a front portion and a pair of opposing side portions extending at an angle from said front portion.

14. The boat protection system of claim 13, wherein said pair of side portions are curved to conform to a shape of said frame of said boat trailer.

15. The boat protection system of claim 9, including a bottom guard attached to a lower portion of said front guard.

16. The boat protection system of claim 15, wherein said front guard includes at least one lower lip, wherein said bottom guard is attached to said at least one lower lip.

17. A boat protection system for protecting a boat from debris encoutered while towing a boat trailer with a vehicle, comprising:
- a front guard attachable to a front end of a frame of said boat trailer, wherein said front guard has a U-shape;
- a front opening extending through said front guard for receiving a winch from said boat trailer;
- a first side guard attached to a first distal end of said front guard by a plurality of fasteners;
- a second side guard attached to a second distal end of said front guard opposite of said first side guard by a plurality of fasteners; and
- wherein said first side guard and said second side guard extend outwardly and in a substantially vertical manner from said front guard.

18. The boat protection system of claim 17, wherein said front guard is comprised of a front portion and a pair of opposing side portions extending at an angle from said front portion.

19. The boat protection system of claim 18, wherein said pair of side portions are curved to conform to a shape of said frame of said boat trailer.

20. The boat protection system of claim 17, including a bottom guard attached to a lower portion of said front guard.

* * * * *